March 28, 1933. T. E. CLARK 1,903,090
MEASURING DEVICE
Filed April 26, 1930 2 Sheets-Sheet 2
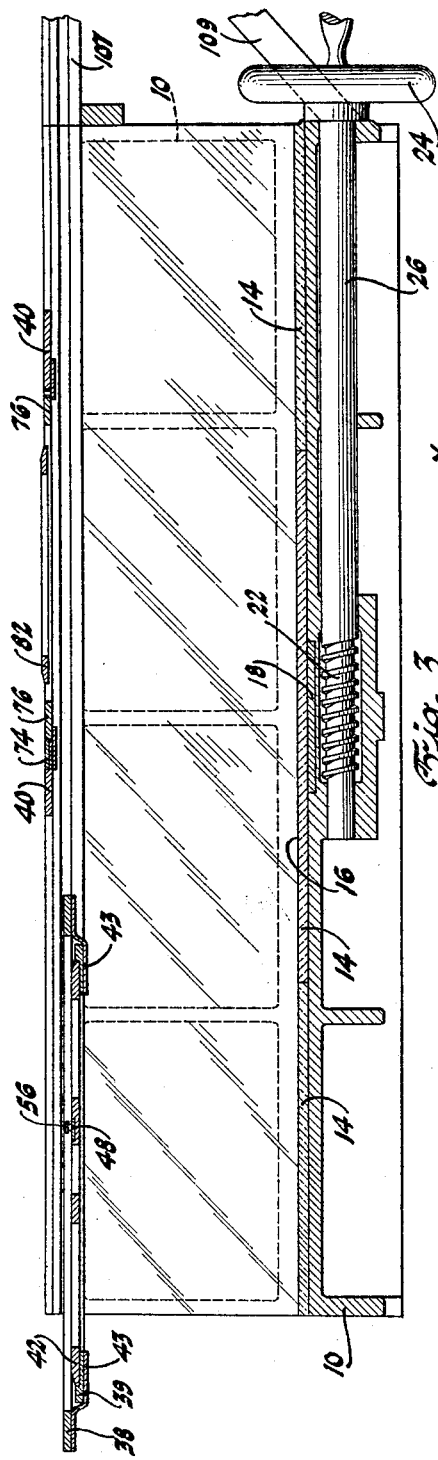
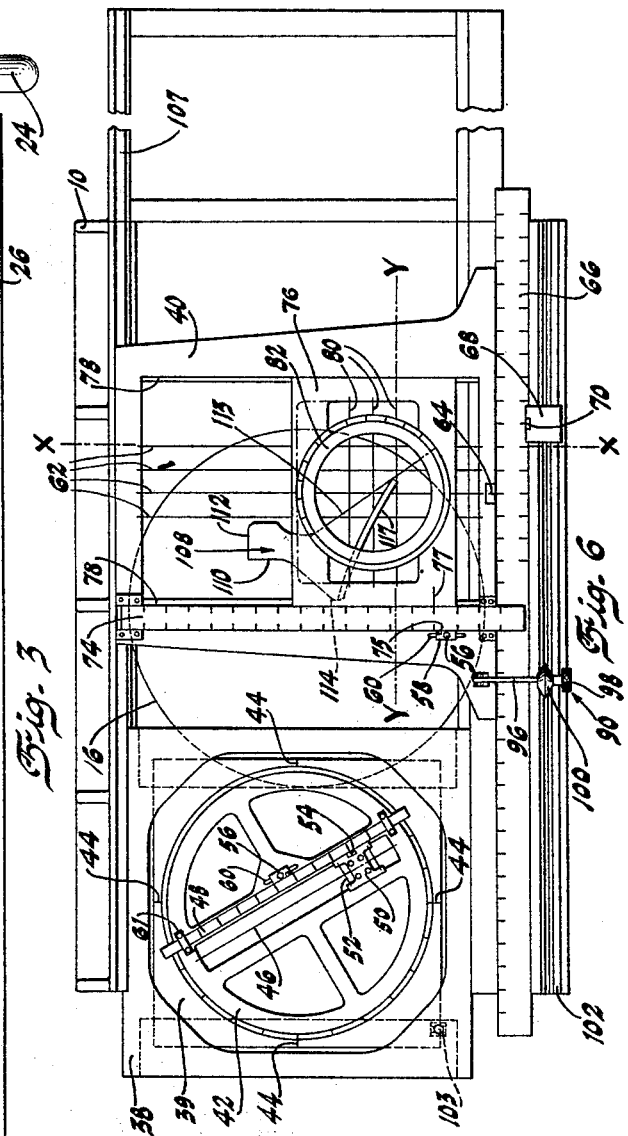
Inventor
Theodore E. Clark
By Blackmore, Brewer & Flint
Attorneys Patented Mar. 28, 1933

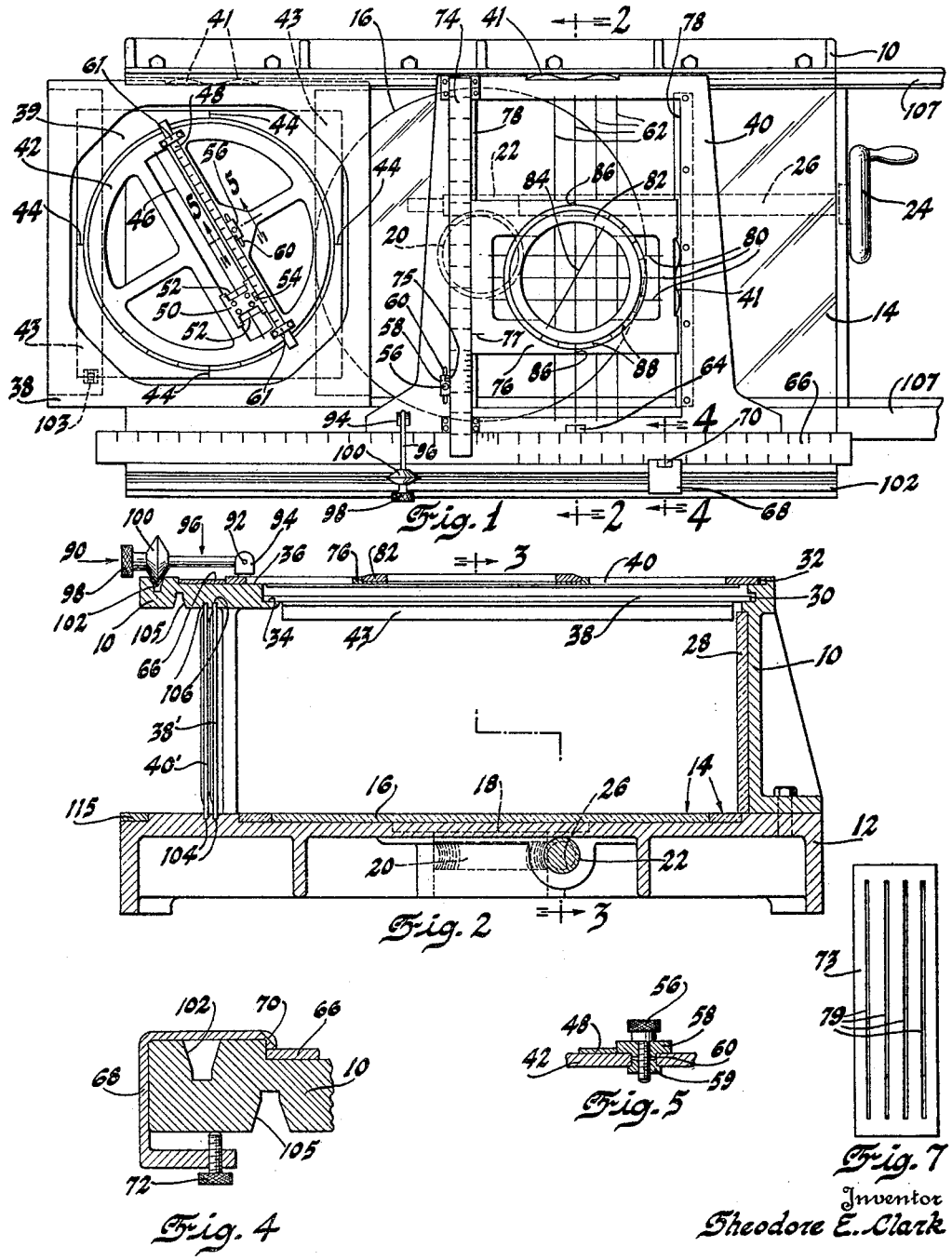

1,903,090

UNITED STATES PATENT OFFICE

THEODORE E. CLARK, OF REDFORD, MICHIGAN, ASSIGNOR TO GENERAL MOTORS CORPORATION, OF DETROIT, MICHIGAN, A CORPORATION OF DELAWARE

MEASURING DEVICE

Application filed April 26, 1930. Serial No. 447,560.

This invention relates to a measuring or checking device for measuring or checking dimensions and angles of a piece of work in its three planes of projection—that is, in plan, side elevation and end views. The device of the invention makes use of the principal of reflection by using a mirror to reflect the image of the wires of the measuring slides.

The mechanism has proved very useful in measuring stampings of plain and irregular construction, rough and finished forgings, rough and finished castings, intricate wood parts such as are used in automobile bodies, and for checking templets and layouts. It replaces many special gages required for checking pieces where contours are dimensioned from intersecting or imaginary points not on the piece of work itself. In many cases it eliminates the necessity for making templets to check from these imaginary points. Much work that cannot well be checked without the aid of special tools may be checked on this device. It replaces the surface plate, surface gages, vernier, height and depth gages, calipers, protractors, and similar gages. It is flexible and universal.

If the work is not flat and cannot be set up on its own face to project a view of the drawing, then it is clamped to a cube or angle plate to give the true view in which it is drawn.

Without a magnifying glass or telescope on the device it is practical to check a piece of work to within plus or minus .005. Greater accuracy, to within .001 or fraction thereof by the aid of a microscope or magnification, has not been required of this mechanism for the reason that much production work is not checked that close and it would impede the speed of checking by sight to within the workable limits demanded for this class of work. However, sight measuring to within one or two ten-thousandths could be had by the use of a microscope or other means of magnification.

The measuring device itself is positioned on a suitable mounting, not shown. The mounting supports a frame having a table positioned in a substantially horizontal plane and on which table a mirror is supported. A portion of the mirror is mounted on a turn-table controlled by the operator. The piece of work to be measured is placed on the mirror and preferably on the turn-table, if its size will permit. The turn-table is for the purpose of rotating the work to any desired position and particularly to swing the object through an angle of 90° in order to obtain end as well as side measurements. Mounted in a parallel plane at a suitable distance over the mirror is a plurality of measuring slides which slide back and forth over the mirror in slots provided in the frame work of the device. The slides are provided with fine stretched piano wires which are reflected in the mirror. By placing the eye over the wire and superposing it with the projected wire in the mirror, a true line is obtained which may be made to correspond with an edge or a line on the piece of work to be measured. Each slide is provided with an index or zero mark and suitable slidable scales are provided which cooperate with the index marks on the slides to obtain distance measurements. Suitable protractors are provided in each slide to obtain the angles on a piece of work.

A set of slides similar to the horizontally positioned ones is slidably mounted at the front of the machine in a vertical plane and is adapted to cooperate with a vertically mounted mirror at the back of the machine.

On the drawings:

Figure 1 is a plan view of the measuring device.

Figure 2 is a section on the line 2—2 of Figure 1.

Figure 3 is a section on the line 3—3 of Figure 2.

Figures 4 and 5 are sections on the lines 4—4 and 5—5 of Figure 1.

Figure 6 is a view corresponding to Figure 1 but with an irregularly shaped object to be measured placed on the mirror.

Figure 7 is a view of a modification.

Referring to the drawings, the numeral 10 indicates a frame mounted on a suitable support (not shown) positioned on the floor. The frame 10 includes the table portion 12 on which the mirror 14 is mounted. The mirror 14 includes the revolvable portion 16 mounted on the turn-table 18 provided with a worm wheel 20 adapted to be rotated by a worm 22 from the wheel and handle 24 through the intermediary of the shaft 26. The circumference of the rotatable mirror 16 is preferably graduated in degrees. A second mirror 28 is mounted at the rear of the frame 10 and at right angles to the mirror 14. If desired the table 12 may be made adjustable so that it may be moved up or down as desired to raise or lower the mirror 14. This adjustment is ordinarily not necessary and one plane for the mirror 14 is ample and satisfactory in practice.

The upper portion of the frame 10 is provided with the grooves 30 and shoulders 32, 34 and 36 in which there are slidably received the measuring slides 38 and 40.

The slide 38 is provided with the spring 41 which presses against the straight edge of the groove 30 to hold the slide 38 in alignment. Mounted in the slide 38 is the protractor slide 39 which is slidable at right angles to the main slide 38 on the shelves 43 secured to the slide 38. The slide 39 is adapted to slide forwardly under the frame 10 of the device to position or adjust the protractor 42 to its most favorable position as it is sometimes desirable to have the protractor 42 farther to the front of the frame although ordinarily no adjustment or movement of the slide 39 is necessary. The slide 38 will usually be ample to get all necessary adjustments of the protractor. Mounted in the slide 39 is the protractor 42, the purpose of which is to measure angles of the object to be checked or measured. The protractor is rotatably mounted in the slide 39 and has its periphery graduated in degrees, which graduation cooperates with the index marks 44 arranged 90° apart on the slide 39. The protractor 42 has stretched diametrically thereacross the piano wire 46 and mounted parallel to the wire 46 is the slidable scale 48 which may be graduated in inches or centimeters. A slide 50 is mounted on the protractor 42 and is provided with one or more wires 52 extending and operating at right angles to the wire 46. The slide 50 slides on the protractor over the wire 46 and has the index mark 54 which is adapted to cooperate with the divisions of the scale 48. Clamping screw 56 is mounted on the protractor 42 immediately adjacent the scale 48. The clamping screw rigidly clamps together the members 58 and 59 slidable somewhat in excess of one inch in the slot 60 in the frame of the protractor 42. The member 58 has an index mark thereon, preferably at one end, which is adapted to cooperate with the slidable scale 48 movably held in place on the protractor in parallelism with the wire 46 by means of the clips 61.

The measuring slide 40 is also provided with a spring 41 to hold the slide 40 in parallelism. The slide 40 is provided with the plurality of tightly stretched piano wires 62, preferably spaced either one or five inches apart. An index mark shown at 64 is adapted to cooperate with the slidable scale 66 mounted at the top and front of the frame 10. A clamping means 68 (Figure 4) having an index mark 70 cooperating with the scale 66, is adapted to be rigidly held in position at the edge of the frame by tightening the thumb screw 72.

Instead of the wires 46 and 62 it is within the scope of the invention to use a plate 73 with one or more small slits 79 as shown in Figure 7.

The slide 40 has also slidably mounted thereon the scale 74 which cooperates with the members 58 and 59 and nut 56 in all respects similar to the correspondingly numbered members described in connection with the protractor slide 42. The member 58 has the index mark 75 cooperating with the divisions on the scale 74.

Slidably mounted in the slide 40 is the secondary or auxiliary slide 76 provided with the index mark 77 which cooperates with the divisions on the scale 74. The slide 76 operates in the grooves or shoulders 78 on the slide 40 and is adapted to slide at right angles to the main slide 40. The auxiliary slide 76 is provided with three tightly stretched piano wires 80, preferably spaced one inch apart, which extend and operate at right angles to the wires 62. The spring 41 holds the slide 76 in alignment in the slide 40.

A removable protractor 82 is mounted in the slide 76 and is provided with one or more wires 84 adapted to cooperate with the wires 62 and 80 of the slides 40 and 76, respectively. The wire 84 is preferably so positioned that it passes through the intersection of the wires 62 and 80, regardless of the position of the protractor. The slide 76 has the index marks 86 at diametrically opposite points which are adapted to cooperate with the divisions 88 of the protractor 82. The divisions 88 are preferably in degrees.

The slides 38 and 40 are moved by hand until they are as close as possible to the desired position. It is not always possible and, in fact, in most instances impracticable to obtain by hand the close adjustment necessary, and for this reason auxiliary devices, one of which is indicated as a whole at 90, are provided on slides 38 and 40 to obtain very small movements. The device 90 is pivoted as at 92 to a bracket 94 rigidly and permanently attached to the slide 40. A rod or shaft 96 extends outwardly beyond the edge of the frame 10 and is provided with an operating knob or handle 98. A double conical wheel 100 is rigidly secured to the rod 96 and operates in the V-shaped groove 102 at the edge of the frame 10. By grasping the handle 98 and pressing downwardly thereon to cause frictional engagement between the wheel 100 and groove 102 and at the same time rotating the handle, the slide 40 may be moved through any desired small distance to obtain an accurate adjustment between the index mark 64 on the slide and the required division on the scale 66. The scale itself is easily and accurately adjustable by hand.

A similar device 90 is provided on the slide 38 but is not shown on the drawings for purposes of clearer illustration. It is preferably applied at 103 and operates in a groove 105 on the underside of the frame 10.

Mounted in grooves 104 and 106 in the frame 10 are the slides 38' and 40', in all respects similar to the slides 38 and 40 except as to size. The slides are adapted to cooperate with the mirror 28 in the same manner that the slides 38 and 40 cooperate with the mirror 14, as will be later described.

An extension shelf or platform 107 is provided at one end of the device and is supported by inclined braces 109. The purpose of the shelf is to slide either slide 38 or 40 out of the way if it is desired to use but one of them.

Referring to Figure 6, the operation of the device will be described in connection with an irregularly shaped object 108 which is shown to be of a size to be positioned on the rotatable mirror 16 of the mirror 14. The operator may first check the dimensions and interposition of the straight line portions 110 and 112 at the end of the object 108 (it is assumed that the object is flat and can be easily placed on the mirror; if it is not flat but of an unusual shape, it is preferably clamped to a cube or angle plate in order to give the true view in which it is drawn). The piece 108 is lined up on the mirror by means of a T square which cooperates with the straight edge 115 at the front of the machine. This may be done by any straight line on the object such as the straight line portion 110. When the object is properly lined up, the slide 40 is moved by hand and by the device 90 until the eye of the operator aligns or superimposes one of the wires 62 with its reflected wire in the mirror 16 and with the edge of the work or line 110. The scale 66 is then adjusted so that one of its divisions conforms with the index mark 64 on the slide 40. The index mark 70 on the clamp 68 is then preferably brought into alignment with the zero mark 64 at the opposite side of the scale 66 and the clamp 68 secured in position. This alignment is not necessary for the index mark 70 may be clamped at any division of the scale. Similarly, the slide 76 is moved by hand so that one of its wires 80 is superimposed with its reflected wire and with the edge 112. The scale 74 on the slide 40 is then adjusted so that one of its divisions conforms to the index mark 77 on the slide 76. The index mark 75 of the member 58 is then brought into alignment with a convenient scale division, preferably an inch mark, and the screw 56 tightened to rigidly hold the member 58. By now moving the slide 76 in the slide 40 to cause the wire 80 to superimpose or align its reflected wire at any desired point on the straight line 110, the exact dimensions on the line 110 will be readable by noticing the change of position of the index mark 77 with reference to the scale 74. The dimensions along the line 110 may also be read with reference to any other point on or outside of the work. Similarly, by moving the slide 40 to cause the aligned wire to move along the edge 112 to any desired point, the distance through which the slide has moved will be directly readable by observing the position of the index mark 64 relative to the scale 66.

If it is desired to measure the angle made by the straight line portion 113 and the length of the line, use is made of the protractor 42 and the slide 38. The wires of slides 40 and 76 are adjusted as previously described until they are positioned with reference to some point and lines from which the angle of the object 108 is taken. The slide 38 is shifted underneath the slide 40 and the protractor 42 rotated to cause the wire 46 thereof to conform to the line 113. The slide 39 may of course be moved to bring the protractor in the most favorable position. The angle is then directly readable on the divisions of the protractor by referring to one of the index marks 44. A wire 52 of the slide 50 is superimposed on its reflected wire at one end of the line 113 or a point at the intersection of the wires 46 and 80 which are placed over or superimposed on the conventional imaginary work lines x—x and y—y tangent to the piece of work 108 at this point, and the scale 48 then moved so that its division or reference mark will agree with the index mark 54 on the slide 50. The member 58 is also made to align with a division on the scale 48. The length of the line or edge 113 may then be determined by moving the slide 50 to the desired point and noticing its new position relative to the scale 48.

In many instances a piece of work of irregular contour is measured from conventional right angularly positioned work lines x—x and y—y. In cases of this kind the wires 62 and 80 are placed over the work lines and the usual adjustment then made of the scales and index marks. The dimensions are then directly readable on the scales from the work or datum line. This is useful in measuring an arcuate line such as the curved line 117. This line will have a plurality of measurements from the work line x—x corresponding to the wire 80 and all measurements will be made by moving the slide 76 until its wire corresponds to the measuring point on the curve 117 and a direct reading had on the scale 74.

The protractor 82 may be used to measure angles only, eliminating the necessity of using slide 38.

The measuring device is particularly useful in obtaining dimensions when referred to a point which is outside the object itself. This occurs where there is a rounded corner such as shown at 114. By rotating the turntable so that one of the straight lines from the rounded edge 114 will conform to one of the wires 62 and its reflection in the mirror 14, and then applying the wire 46 of the protractor 42 to the other line, their intersection will indicate the point of meeting of the two lines. Measurements along the lines may then be taken as previously described in connection with the straight line portions 110 and 112 of the object 108.

Side elevational and end dimensions are obtained by the use of the slides 38' and 40' in connection with their reflected wires in the mirror 28.

The advantages claimed of this mechanism are the practicability of checking pieces where dimensions are given to imaginary points or points outside the piece of work, such as the intersection of tangent and secant points which cannot be checked without the aid of special gages. It is possible to check an ordinary difficult stamping in about fifteen minutes as against three hours on a surface plate. Readings can be made directly and individually, and it is possible to read the errors directly from zero plus or minus as the case may be without the possible error in addition or subtraction. It is possible to check a piece of work in its three angles with one setting, whereas three or more settings are now required in checking upon a surface plate. The elimination of addition and subtraction is accomplished by setting the scale at zero and reading directly each dimension individually as dimensioned on a drawing. Where dimensions are given in even inches on the drawing it is possible to check as many points on the work at once as there are wires on the slide.

In some instances where an unusually large object is placed on the mirror so as to cover the greater portion thereof, it has been found that there is not enough of the mirror left exposed to conveniently check the dimensions of the object. In situations of this kind and where the object is flat, a smaller mirror is placed thereon. This smaller mirror will then be positioned in a plane parallel to the larger one. In case the large object is irregular, a pair of blocks are placed at opposite sides of the object and the smaller mirror placed on the blocks and over the object. The smaller mirror may now be used in the same way as the larger one.

I claim:

1. In a measuring device, comprising a measuring slide, a protractor in said slide, a second slide in said protractor, a mirror positioned in a spaced parallel plane relative to said slide, and measuring means on said protractor cooperating with said second slide and adapted to be reflected in said mirror.

2. In a measuring device, comprising a measuring slide, a protractor in said slide, a measuring slide on said protractor, a mirror positioned in a spaced parallel plane relative to said slide, and measuring means on said protractor cooperating with said protractor slide and adapted to be reflected in said mirror.

3. In a measuring device, comprising a measuring slide, a protractor in said slide, a slide in said protractor, a scale on said protractor, a mirror positioned in a spaced parallel plane relative to said protractor, and measuring means on said protractor cooperating with said scale and protractor slide and reflected in said mirror.

4. In a measuring device, comprising a first measuring slide, a movable scale cooperating with said slide, a second slide in said first slide, a movable scale on said first slide cooperating with said second slide and positioned at right angles to said first mentioned scale, a protractor in said second slide, measuring means on said slides and protractor, a third measuring slide positioned in a plane slightly spaced from the plane of said first slide, a protractor in said third slide, a fourth slide in said protractor, measuring means on said second protractor cooperating with said fourth slide, a movable scale positioned on said second mentioned protractor parallel with said second mentioned measuring means, all of the preceding mentioned elements positioned in horizontal planes, a mirror common to all of said elements, said mirror including a rotatable portion and receiving the object to be measured, said measuring means being reflected in said mirror to measure the object, a second similar set of elements positioned in a vertical plane and at right angles to said first set of elements, and a common mirror for said second set of elements, said second set of elements measuring the object from its position on the first mirror.

5. In a measuring device, a frame, a shiftable measuring slide mounted on said frame, a flat image-reflecting means spaced from and mounted parallel with said slide and receiving the object to be measured, said slide being shiftable over said means, and measuring means on said slide reflected in said reflecting means to measure the object on the reflecting means.

6. In a measuring device, a frame, a measuring slide mounted on said frame, a flat mirror supported beneath and parallel to said slide and receiving the object to be measured, said slide being shiftable over said means, and a wire on said slide reflected in said mirror to effect the measuring of the object.

7. In a measuring device, comprising a horizontal measuring slide for measuring an object in a horizontal plane, a horizontal mirror beneath said slide receiving the object to be measured, a vertical measuring slide to measure the object in a vertical plane, a vertical mirror spaced from said vertical slide, and measuring means on each of said slides, said means being reflected in said mirrors, both of said slides measuring said object from a single position.

8. In a measuring device, comprising a horizontal measuring slide adapted to make measurements of an object in a horizontal plane, a vertical measuring slide to measure the object in a vertical plane, horizontal and vertical mirrors positioned in spaced planes relative to said slides, said horizontal mirror receiving the object to be measured, and one or more wires on each of said slides, said wires being reflected in said mirrors to measure said object in two planes for a single position.

9. In a measuring device, a frame, a plurality of horizontal measuring slides mounted in said frame, a flat mirror mounted beneath said slides in a spaced parallel plane and adapted to receive the object to be measured, said slides shiftable on said frame over said mirror, and measuring wires on said slides, said wires being reflected in said mirror to measure the object.

10. In a measuring device, a frame, a measuring slide reciprocably mounted in said frame, a shiftable scale mounted in said frame adjacent said slide and cooperating therewith, a flat mirror mounted in said frame beneath said slide in a plane parallel thereto, said slide reciprocable over said mirror, said mirror receiving the object to be measured, and measuring means on said slide, said means being reflected in said mirror to measure the object.

11. In a measuring device, a frame, a measuring slide reciprocably mounted in said frame, a plurality of shiftable scales adjacent said slide and cooperating therewith, a flat mirror mounted in said frame beneath said slide and adapted to receive the object to be measured, and measuring means on said slide, said means being reflected in said mirror to measure the object.

12. In a measuring device, a frame, a plurality of measuring slides mounted in said frame for reciprocatory movement, a plurality of shiftable scales mounted adjacent said slides and cooperating therewith, a flat mirror mounted in said frame beneath said slides and receiving the object to be measured, and measuring means on each of said slides, said means being reflected in said mirror to measure the object.

13. In a measuring device, a frame, a shiftable measuring slide mounted on said frame, rotatable reflecting means mounted on said frame in spaced relation relative to said slide and in a plane parallel thereto, said means receiving the object to be measured, said slide adapted to be shifted back and forth over said means, and measuring means on said slide, said measuring means being reflected in said reflecting means to measure the object.

14. In a measuring device, a frame, a shiftable measuring slide mounted on said frame, rotatable reflecting means mounted on said frame in spaced relation relative to said slide and in a plane parallel thereto, said means receiving the object to be measured, said slide adapted to be shifted back and forth over said means, means to rotate said reflecting means to change the position of said object, and measuring means on said slide, said measuring means being reflected in said reflecting means to measure the object.

15. In a measuring device, a frame, a first measuring slide reciprocably mounted on said frame, a second measuring slide reciprocably mounted in the first slide, a flat mirror common to both slides and mounted in said frame in a plane parallel to and spaced from said slides, said slides reciprocable over said mirror, said mirror receiving the object to be measured, and measuring means on both slides, said means being reflected in said mirror to measure the object.

16. In a measuring device, a frame, a first measuring slide reciprocably mounted in said frame, a second measuring slide reciprocably mounted in the first slide, a protractor in said second slide, a mirror common to said slides and protractor and mounted in said frame in a plane parallel to and spaced from said slides, said slides reciprocable over said mirror, said mirror receiving the object to be measured, and measuring means on each of said slides and on said protractor, said means being reflected in said reflecting means to measure the object.

17. In a measuring device, a frame, a measuring slide reciprocably mounted in said frame, a protractor in said slide, a flat mirror mounted on said frame in a spaced parallel plane relative to said slide and receiving the object to be measured, said slide reciprocable over said mirror, and measuring means on said protractor, said means being reflected in said mirror to measure said object.

18. In a measuring device, a frame, a measuring slide reciprocably mounted in said frame, a protractor in said slide, a scale on said protractor, a mirror mounted in said frame and positioned in a spaced parallel plane relative to said slide and receiving the object to be measured, said slide reciprocable over said mirror, and measuring means on said protractor cooperating with said scale and adapted to be reflected in said mirror to measure the object.

19. In a measuring device, a frame, a measuring slide reciprocably mounted in said frame, a scale cooperating therewith and mounted on said frame, a second measuring slide reciprocably mounted on said first mentioned slide, a scale mounted on said first slide and cooperating with said second slide, a protractor in said second slide, a mirror common to said slides and protractor and receiving the object to be measured, said mirror mounted in said frame in a plane parallel to said slides, and measuring means on said slides and said protractor, said means being reflected in said mirror to measure said object.

20. In a measuring device, a frame, a first measuring slide mounted for reciprocatory movement in said frame, a second measuring slide mounted for reciprocatory movement in said frame and movable in a plane slightly spaced from the first slide, a third measuring slide mounted for reciprocatory movement in said first slide, a protractor in said third slide, a protractor in said second slide, a mirror common to all of said slides and protractors, said mirror receiving the object to be measured and mounted in said frame in a plane parallel to said slides, and measuring means on said slides and protractors, said means being reflected in said mirror to measure the object.

In testimony whereof I affix my signature.

THEODORE E. CLARK.